United States Patent [19]

Motegi et al.

[11] Patent Number: 4,930,358

[45] Date of Patent: Jun. 5, 1990

[54] METHOD OF AND APPARATUS FOR MEASURING FLOW VELOCITY BY USING ULTRASONIC WAVES

[75] Inventors: Ryohei Motegi; Shinichi Takeuchi; Toshio Sato, all of Tokyo, Japan

[73] Assignee: Tokyo Keiki Co., Ltd., Tokyo, Japan

[21] Appl. No.: 171,257

[22] Filed: Mar. 21, 1988

[30] Foreign Application Priority Data

Mar. 27, 1987 [JP] Japan ................................. 62-73389
Jun. 3, 1987 [JP] Japan ............................... 62-139398

[51] Int. Cl.$^5$ .............................................. G01F 1/66
[52] U.S. Cl. .................................................. 73/861.28
[58] Field of Search ................ 73/644, 861.27, 861.28, 73/861.18

[56] References Cited

U.S. PATENT DOCUMENTS

| | | | |
|---|---|---|---|
| 3,973,152 | 8/1976 | Karplus | 73/644 |
| 4,173,889 | 11/1979 | Forster et al. | 73/861.27 |
| 4,300,400 | 11/1981 | Bistrian et al. | 73/861.28 |
| 4,454,767 | 6/1984 | Shinkai et al. | 73/861.18 |
| 4,467,659 | 8/1984 | Baumoel | 73/644 |
| 4,483,202 | 11/1984 | Ogura et al. | 73/861.27 |
| 4,610,167 | 9/1986 | McShane | 73/861.28 |
| 4,735,097 | 4/1988 | Lynnworth | 73/861.28 |
| 4,748,857 | 6/1988 | Nakagawa | 73/861.28 |

OTHER PUBLICATIONS

Ultrasonic Flowmeters, by J. L. McShane, Flow, Its Measurement and Control in Science and Industry–vol. 1, Part II, 1974.

Primary Examiner—Charles A. Ruehl
Attorney, Agent, or Firm—Sandler, Greenblum & Bernstein

[57] ABSTRACT

The present invention relates to a method of and an apparatus for measuring flow velocity by using ultrasonic waves. Sound velocities of wedge portions constituting ultrasonic transducers provided at the upstream and the downstream sides of a piping, respectively, are measured, and the ultrasonic wave is oscillated from the upstream side to the downstream side and from the downstream side to the upstream side, respectively, and propagated in a fluid in the piping and respective times from the oscillating to receiving are measured. These measured values are substituted into a predetermined function and calculated, to thereby search the flow velocity of the fluid in the piping. Each of the ultrasonic transducers is connected thereto with a transmission-reception changeover section, a timer device for measuring a propagation time, during which the ultrasonic wave is propagated in the fluid in the piping and received, and an operational device for processing output data, which is delivered from the timer device in a predetermined manner. An opening length of the ultrasonic transducer in contact with the piping is about 15 wave lengths or more of a center frequency used, whereby the ultrasonic waves become parallel beams, so that an angle of directivity becomes small.

6 Claims, 9 Drawing Sheets

METHOD OF AND APPARATUS FOR MEASURING FLOW VELOCITY BY USING ULTRASONIC WAVES

BACKGROUND OF THE INVENTION

1. Field of the Invention

This invention relates to a method of and an apparatus for measuring the flow velocity of fluid by using ultrasonic waves and, more particularly, to a method of and an apparatus for measuring the flow velocity of fluid flowing through piping by mounting ultrasonic transducers on the outer surface of a portion of the piping.

2. Description of Background Information

FIG. 9 shows a conventional example. In this example, ultrasonic waves are emitted from an ultrasonic wave vibration element 51 of ultrasonic transducer 50 in a downstream direction and travel via propagation paths $l_1, l_2, l_3, l_4, l_5$ and reach an ultrasonic wave vibration element 61 of an ultrasonic transducer 60. The propagation time in this case is represented by $t_d$.

An ultrasonic wave which is emitted from an ultrasonic vibration element 61 of the ultrasonic transducer 60 travels via propagation paths $l_5, l_4, l_3, l_2, l_1$, and reaches the ultrasonic wave vibration 51 of the ultrasonic transducer 50. The propagation in this case is represented by $t_u$.

In this case, flow velocity in a piping 3 is determined or searched by the equation:

$$V = (C^2/2D \tan \theta_3) \cdot (t_u - t_d) \qquad (F-1)$$

where D represents the inside diameter of piping 3, $\theta_3$ the angle of refraction in the fluid, and C the sound velocity of the fluid.

As a result, flow velocity at which the fluid flows through the piping 3 can be obtained relatively easily on the basis of the above equation if the sound velocity in the fluid has been previously determined. At the time, the flow rate at which the fluid flows through piping 3 can also be obtained very easily since the inside diameter of piping 3 is known.

However, the directivity, i.e. spreading in the propagation direction of the ultrasonic wave varies considerably depending on the size of a vibration source (vibration element or a vibrating plane). On the other hand, a value, which an angle of incidence $\theta_1$ can take, greatly depends on this directivity. More specifically, as the vibration source decreases in size, the directivity of the angle of incidence $\theta_1$ increases in width. For this reason, in measuring the flow rate by the ultrasonic waves, many errors may be easily included in the measured values depending on the measuring conditions.

In general, an angle of directivity $\beta$ of a first zero radiation angle indicating the magnitude of this directivity is represented by the following equation:

$$\beta \approx 57 \lambda/b_0 \text{(degree)} \qquad (F-2)$$

where $b_0$ indicates a width of the vibration source and $\lambda$ a wave length of the ultrasonic wave in a propagation medium.

On the other hand, in the ultrasonic transducers for the most commonly used flowmeters, if the size of a surface being in contact with the piping is b, then $b_0 = b \cos \theta$ (where $\theta$ is a radiation-propagation angle into the piping as in FIG. 9). In actuality, $b_0 \approx 5\lambda$ or $8\lambda$ in many cases, and the case of $b_0 \approx 10\lambda$ is very rare. For this reason, the angle of directivity $\beta \approx 5.7°$ even when $b_0 \approx 10\lambda$. Accordingly, the ordinary ultrasonic transducer has a spreading angle of $\pm 13°$ or more at all times.

As described above, the conventional ultrasonic transducer has a broad directivity, whereby the spreading of the angle of refraction $\theta_3$ directly causes errors in flow velocity of the fluid as seen in equation (F-2), thus presenting an intrinsic disadvantage that on the wave receiving side, that in order to properly set the angle of refraction, much time and labor have been required for specifying the central position of the ultrasonic wave being propagated at a proper angle out of beams having broad angle widths.

At the same time, there are many cases where spreading of the angle of directivity of the propagated ultrasonic wave approaches or includes one or two excitation conditions (determined by the angle of incidence) out of a plurality of resonance modes ('a' mode of 's' mode of lamb wave) peculiar to the thickness of piping.

For this reason, on the receiving side, the receiving position is set so as to constantly detect the highest value, whereby other resonance modes high in energy transmittivity are frequently detected, so that considerable errors occur in the detected values. More specifically, the ultrasonic wave beams cannot be regarded as parallel beams because the angle of directivity of the ultrasonic wave is broad, and the propagation path of the ultrasonic wave cannot be accurately specified in all parts of a wedge member, a piping wall and the fluid in the piping because propagation can occur in an unexpected direction due to a harmful mode. Therefore, it becomes difficult to determine how much time has been required for traveling through the fluid in the piping out of both the propagation times $t_u$ and $t_d$, which have been measured, thus presenting such a disadvantage that in the conventional type ultrasonic flow velocity-flow rate meters, the measuring principle, which is based on the Doppler effect, intrinsically lacks reliable measurement.

The angle of the ultrasonic wave radiated into the fluid by the resonance mode is determined by a phase velocity of the lamb wave propagated in the wall of the piping due to the resonance mode and the sound velocity of the fluid.

Accordingly, for the substantial angle of refraction in the case where the ultrasonic wave in propagated in the fluid and received, there are many cases where an angle of input $\theta_1$ in the wedge member does not coincide with the angle of refraction $\theta_3$ determined by Snell's law. For this reason, considerable errors occur in the measured values, thus presenting a lack of reliability.

SUMMARY OF THE INVENTION

The present invention has been developed to obviate the disadvantages of the conventional examples and has as its object the provision of a method of and an apparatus for measuring the flow velocity by ultrasonic waves, wherein, even if a distance between a pair of ultrasonic transducers which are mounted on a piping is roughly set, the method has such good reliability that the flow velocity of a fluid in the piping can be measured with high accuracy.

Another object of the present invention is to provide a method of and apparatus for measuring the flow velocity by ultrasonic waves, wherein the directivity of ultrasonic wave leaking and being propagated into the piping is sharpened, whereby a mode wave as a harmful component is prevented from occurring, to thereby greatly improve the accuracy of measurement.

To achieve the above-described objected, the present invention is directed to a method wherein two ultrasonic transducers, in each of which a considerably small angle of directivity is formed, are respectively provided on the upstream and downstream sides of a piping at a proper interval, the ultrasonic waves are made to alternately and obliquely enter the piping through the outer wall so as to measure sound velocities $C_1$ of wedge portions in the ultrasonic wave transducers at the time of measurements. The ultrasonic waves oscillate from the upstream side to the downstream side and from the downstream side to the upstream side at about the times of these measurements, ($t_d$ and $t_u$), during which the ultrasonic waves thus oscillated are propagated in the wall of the piping and the fluid in the piping. The waves are received and measured in sequence, and these measured values $C_1$, $t_d$, $t_u$ and a distance $L_x$ between the ultrasonic transducers are substituted into a previously given specified function, i.e. $V = F(C_1, t_u, t_d, L_x)$, which is calculated by use of a necessary constant or constants, to thereby determine or search the flow velocity V of the fluid in the piping.

To achieve the above-described objects, the present invention is directed to an apparatus including two ultrasonic transducers, in each of which a considerably small angle of directivity is formed, which are respectively mounted on the upstream and downstream sides of a piping along a line of propagation of the ultrasonic waves, and a transmission-reception changeover section for switchingly connecting a transmitting circuit section and a receiving circuit section to these two ultrasonic transducers alternately as necessary. The receiving circuit section is provided with a timer means for measuring propagation times $t_d$ and $t_u$, during which the ultrasonic waves emitted from the ultrasonic transducers and transmitted from the upstream side to the downstream side and from the downstream side to the upstream side are propagated in the wall of the piping and the fluid in the piping and received, and a memory means for storing these propagation times $t_d$ and $t_u$ and a mounting distance $L_x$ between the ultrasonic transducers. The memory means is made to store measured values of sound velocities $C_1$ of wedge members in the ultrasonic wave transducers at the time of measuring the flow velocity and another constant or constants, and is provided with a flow velocity operational means for performing predetermined calculations on the basis of respective output data from the memory means, to thereby specify the flow velocity of the fluid in the piping.

DETAILED DESCRIPTION OF THE PREFERRED EMBODIMENT

One embodiment of the present invention will now be described with reference to FIGS. 1 to 8.

Figure 1:
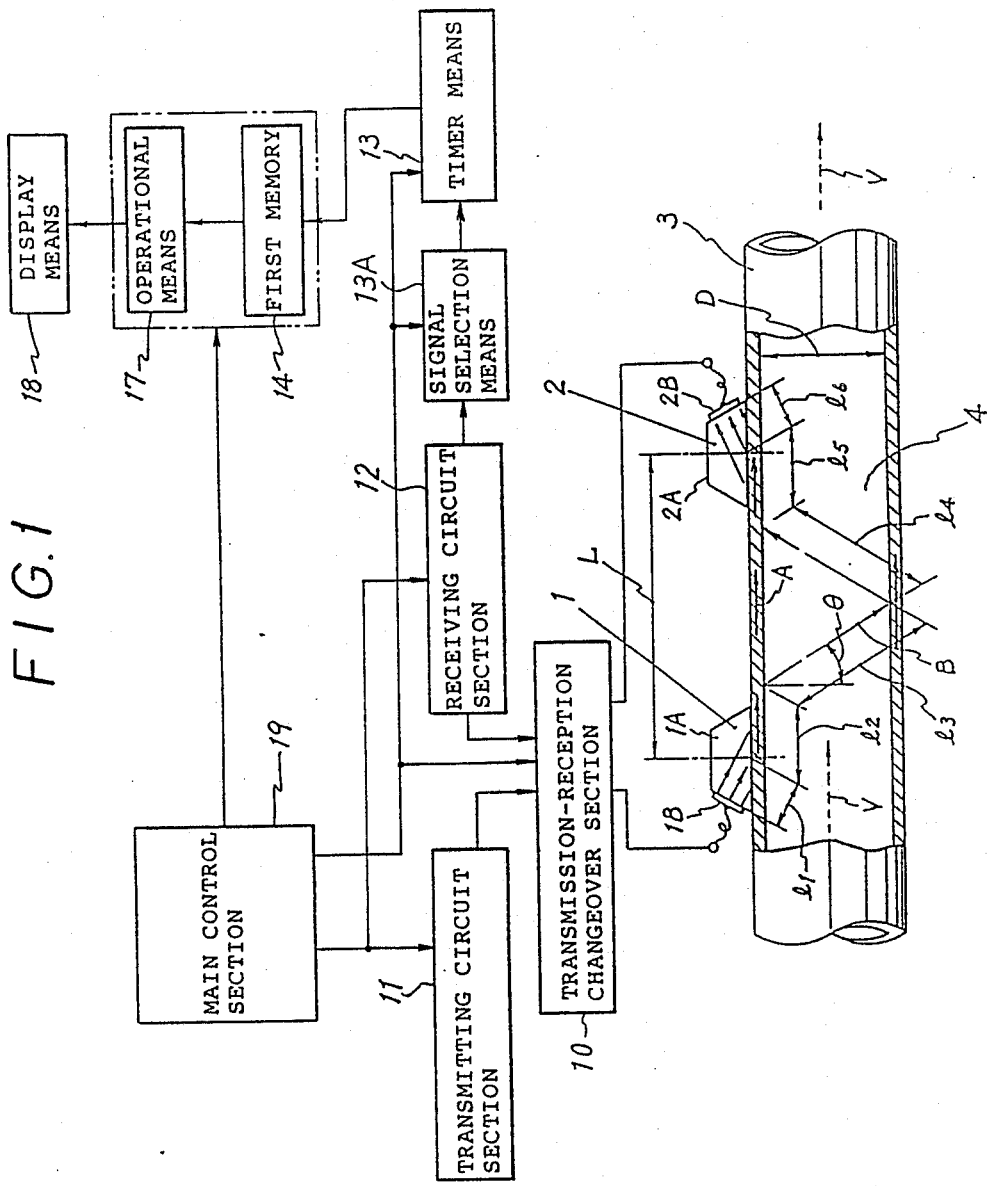
FIG. 1 is a block diagram showing an embodiment of the present invention.
Figure 3:
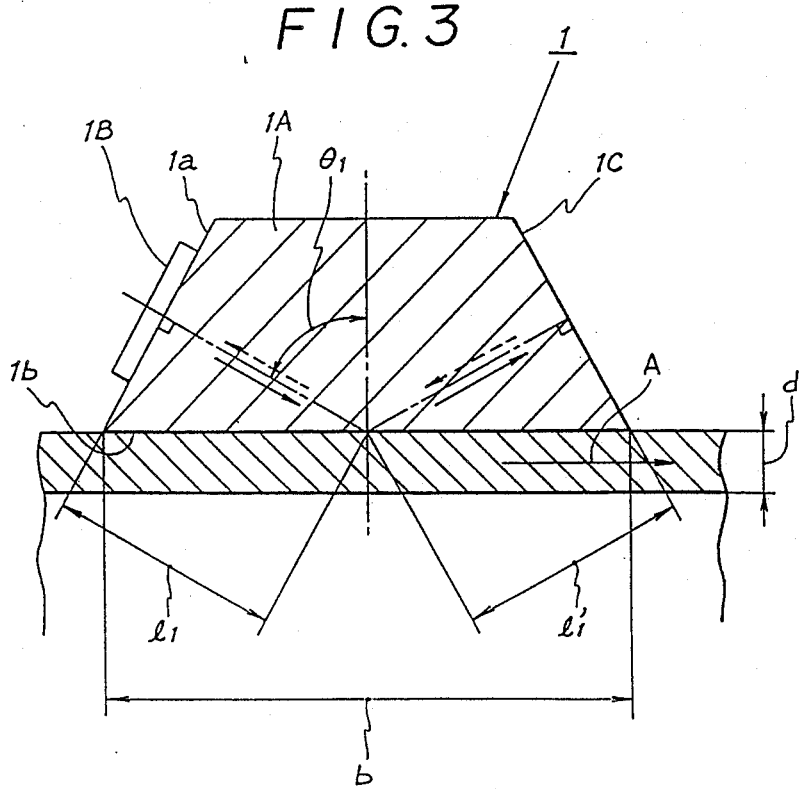
FIG. 3 is an explanatory view showing an example of the ultrasonic transducer used in the embodiment shown in FIG. 1.

Referring to FIG. 1, reference numeral 1 is a first ultrasonic transducer mounted on the upstream side of piping 3. Second ultrasonic transducer 2 is mounted on the downstream side of piping 3. The first ultrasonic transducer 1 is provided with wedge member 1A and vibration element 1B for making the ultrasonic wave obliquely enter piping 3, as shown in FIG. 3. Wedge member 1A is made of acrylic resin or the like and has a trapezoidal sectional configuration. Ultrasonic vibration element 1B is secured at one of the slanted surfaces of wedges member 1A. Slanted surface 1C constitutes an ultrasonic wave reflection plane which perpendicularly intersects a propagation page when the ultrasonic wave is oscillated from ultrasonic vibration element 1B and reflects at a plane of incidence 1b, which becomes an ultrasonic wave radiating plane of wedge member 1A. For this reason, an internal reflected wave being propagated in the wedge member 1A is adapted to return to the side of the ultrasonic vibration element 1B. Furthermore, a length b of the plane of incidence 1b is an opening surface for ultrasonic waves being made to leak and radiated into the piping which is about 18 wave lengths or more of a center frequency being used.

Figure 4:
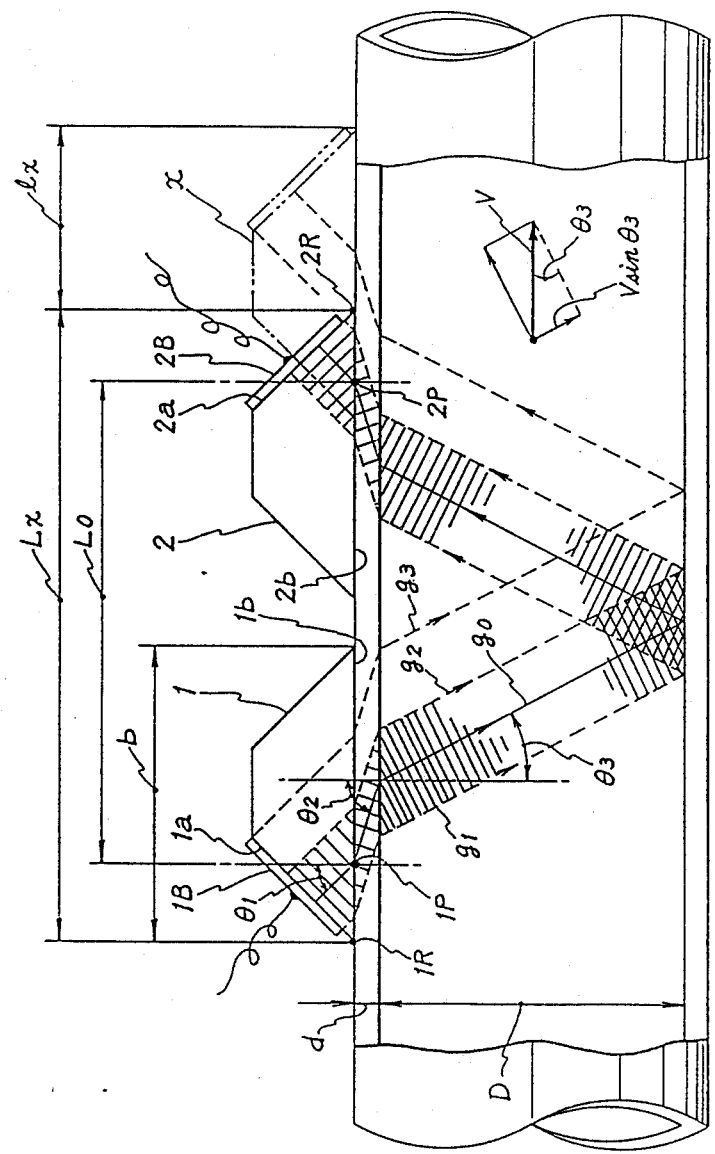
FIG. 4 is an explanatory view showing operations of the supersonic transducer at the time of measuring in FIG. 1.

As shown in FIG. 4, when an opening of the vibration element 1B is lengthened beyond an extent and the length b of the plane of incidence 1b has the length of about 18 wave lengths or more, the angle of directivity becomes very small, so that the ultrasonic wave beams being propagated in sequence in the wedge member, the wall portion of the piping, and the fluid in the piping can be regarded as generally parallel beams.

Each ultrasonic transducers 1 and 2 is connected to transmitting circuit section 11 and receiving circuit section 12 through a transmission-reception changeover section 10, respectively, as shown in FIG. 1. FIG. 1 shows the case where a liquid in piping 3 flows from the left-hand side to the right-hand side in the drawing.

Figure 2:
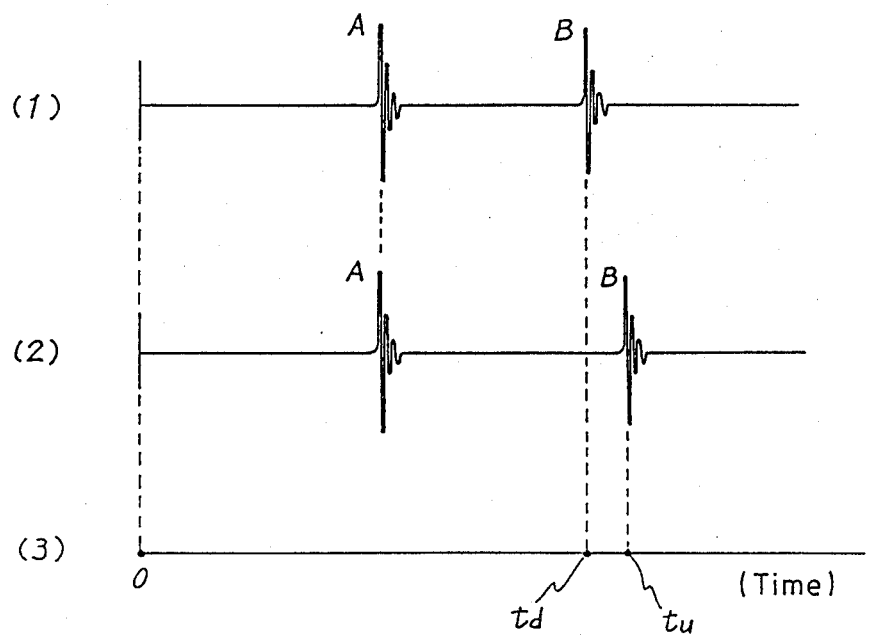
FIG. 2 is a chart showing an example of the measured data of FIG. 1.

In each of ultrasonic transducers 1 and 2, repetition signals shown in FIG. 2 are received in accordance with the flow velocity in piping 3. More specifically, as shown in FIG. 1, the ultrasonic wave emitted from the ultrasonic transducer 1 on the upstream side is divided into two, including a propagated wave A being propagated in the wall of the piping 3 and a propagated wave B traveling through the wall of piping 3 and being propagated into the liquid in piping 3.

More particularly, when the ultrasonic wave travels from the upstream side to the downstream side, received signals of the incoming ultrasonic wave, as shown in FIG. 2(1), travel through signal selection means 13A and are delivered to timer means 13, where the propagation time $t_d$ is measured and temporarily stored in first memory 14.

Subsequently, when the transmission-reception changeover section 10 acts to output the ultrasonic wave from the downstream to the upstream, received signals of the incoming ultrasonic wave, as shown in FIG. 2(2), travel through the receiving circuit section 12 and the signal selection means 13A and are delivered to timer means 13, where the propagation time $t_u$ is timed and temporarily stored in first memory 14.

Next, at the time before or after the above-described operations, the sound velocities $C_1$ of the wedge members in the ultrasonic transducers are measured. There is no need for performing this every time the flow velocities are measured, and it may be performed as the occasion may demand. To measure the sound velocity in the wedge member, either one of the ultrasonic transducers 1 and 2 is connected to transmitting circuit section 11 and receiving circuit section 12 through transmission-reception changeover section 10 as shown in FIG. 1. When ultrasonic transducer 1 is connected, for example, the ultrasonic wave output from vibration element 1B, shown in FIG. 3, is reciprocatorily propagated via paths $l_1$ and $l'_1$ received by the vibration element 1B. This signal travels through receiving circuit section 12 and signal selection means 13A and is delivered to timer means 13, where the propagation time $t_w$, for example, is temporarily stored in first memory 14.

The respective data of the propagation times $t_d$, $t_u$ and $t_w$, which are stored in first memory 14, are immediately supplied to operational means 17. The flow velocity V which is calculated on the basis of equation (F-1) and specified in operational means 17 is adapted to be displayed by display means 18. Furthermore, the flow rate is calculated on the basis of the flow velocity V and the sectional area of the piping in operational means 17, and also displayed by display means 18. Main control section 19 controls a series of operations for these component means.

The theoretical process to search the flow velocity V will now be described by use of the measured propagation times $t_w$, $t_u$ and $t_d$.

First, the sound velocities $C_1$ in the wedge members in ultrasonic transducers 1 and 2 are obtained by equation:

$$C_1 = 2(l_1 + l'_1)/t_w \tag{1}$$

where $l_1$ and $l'_1$ are path lengths of paths $l_1$ and $l'_1$ as shown in FIG. 3.

With reference to FIG. 4, the total propagation time $t_0$, when the flow rate V=0, is obtained by equation:

$$t_0 = [2\{(L_x - L_o)/2 \cdot \sin U_1/C_1\} + \{2(d/\cos \phi_2)/C_2\} + \{N(D/\cos \phi_3)/C_3\} + \tau_c \tag{2}$$

where $L_0$ is a distance between points of incidence 1P and 2P of a center path $g_0$; $L_x$ is a distance between points of intersection 1R and 2R between vibration element joined surfaces 1a and 2a ultrasonic wave radiating surfaces 1b and 2b; $\theta_1$ indicates an angle of incidence of the ultrasonic wave from the interior of the wedge member 1A into the piping 3. $\theta_2$ and $\theta_3$ are connected to $\theta_1$ and angles of refraction (in this case, angles indicating the directions of propagation) of the ultrasonic waves on the wall surface of piping 3 and in the fluid in piping 3; and $C_1$, $C_2$ and $C_3$ are sound velocities in wedge member 1A, wall of the piping 3 and the fluid in the piping, respectively. These satisfy Snell's law because the angle of directivity of the ultrasonic wave is small. Designated at d is a wall thickness of the piping and D is an inside diameter of the piping. N is the number of paths in the fluid of the ultrasonic wave, and in FIGS. 1 and 4, N=2. $\tau_c$ is an electric delay time in a cable or the like.

The propagation times $t_u$ and $t_d$ searched when the flow velocity V=0 are as follows:

$$t_u = [\{(L_x - L_o)\sin \phi_1\}/C_1] + \{(2d/\cos \phi_2)/C_2\} + \{(ND/\cos \phi_3)/(C^3 - V\sin \phi^3)\} + \tau^c \tag{3}$$

$$t^d = [\{(L^x - L^o)\sin \phi^1\}/C^1] + \{(2d/\cos \phi_2)/C_2\} + \{(ND/\cos \phi_3)/(C_3 - V\sin \phi_3)\} + \tau_c \tag{4}$$

Since, normally, $C_3 >> V$ (for example, when the fluid is water, $C_3 \approx 1500$ m/s, and, the largest value of V is 20 m/s), the following equation is approximately established:

$$t_0 = (t_u + t_d)/2 \tag{5}$$

Accordingly, the flow velocity V can be searched through the expressions (3), (4) and the approximation between Snell's law and $C_3 >> V$.

$$V = (C_1^3/\sin \phi_1) \cdot \tag{6}$$

$$[\{(t_u + t_d - 2\tau)(t_u - t_d)\}/\{C_1^2(t_u + t_d - 2\tau)^2 + (2ND \sin \phi_1)^2\}]$$

where $$= \{(L_x \sin \phi_1)/C_1\} + \{(2d \cos \phi_2)/C_2\} + \tau_c \tag{7}$$

As a result, when the path lengths in the wedge members ($l_1 - l'_1$), the mounting distance $L_x$, the angle of incidence $_1$ into the wedge member, the sound velocity $C_2$ in the piping wall, the delay time $_c$ in the cable, the number N of the paths in the fluid, the wall thickness d of the piping and the inside diameter D of the piping are stored in first memory 14, the flow velocity V can be calculated with equation (1), the equation shown below, and further by equations (7) and (6).

$$\cos \theta_2/C_2 = (1/C_2)^2 - \sin \theta_1/C_1)^2 \tag{8}$$

According to the present system, the sound velocity $C_3$ in the fluid can be represented by the following equation:

$$C_3 - N D/(t_0 - \tau)^2 + (N D \sin \theta_1/C_1)^2 \tag{9}$$

As a result, the sound velocity $C_3$ of the fluid becomes unnecessary in the expression (6) of the flow velocity V. More specifically, even if the sound velocity $C_3$ is unknown, the flow velocity V can be satisfactorily searched according to the present system.

The distance $L_0$ between the points of incidence 1P and 2P is unnecessary in equation (6), with the result that the necessity of strictly specifying the points of incidence in the ultrasonic transducer is eliminated. It is only necessary that the mounting distance $L_x$ be known. Therefore, the accuracy of the mounting positions of the ultrasonic transducers is almost unnecessary, so that a considerable tolerance can be obtained.

The above-described two points overcome the problems that, in the conventional ultrasonic flowmeters, due to changes in temperature of the fluid, the sound velocity $C_3$ of the fluid and the points of incidence 1P and 2P or the propagation paths have been unclear.

From the above-described points, the predetermined functions in the expressions (1), (7) and (8) as applied in expression (6) can be determined.

The following description concerns the errors in the measured values in the ultrasonic flowmeters which vary greatly due to the directivities of the ultrasonic transducers 1 and 2, on the basis of the relationship with the conventional example and the results of experiments.

Figure 5:
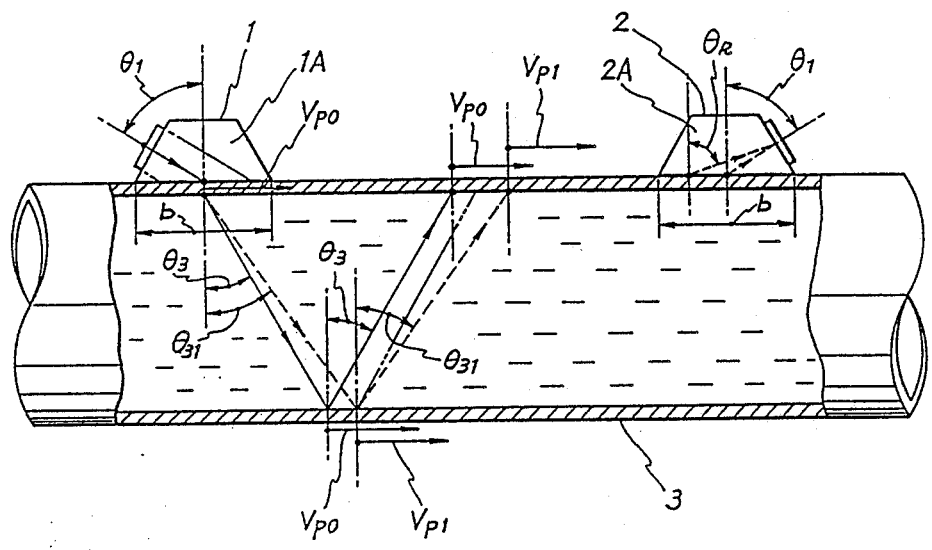
FIG. 5 is an explanatory view showing operations of the ultrasonic transducers, illustrating the spreading of the ultrasonic wave.

Referring to FIG. 5, which shows the conventional example, the ultrasonic wave which enters into the piping 3 at an angle $\theta_1$ from the ultrasonic transducer 1 is propagated into the piping 3 with the spreading of $\pm 3°$ or more to the center angle of refraction $\theta_3$ as generally described above, and is reflected at the inner wall on the opposite side or radiated again and propagated to the ultrasonic transducer 2 on the receiving side.

When this angle of incidence having the spreading is close to the excitation condition of the resonance mode (lamb wave) of the piping as described above, there is a tendency that the lamb wave $V_{p0}$ is generated in the piping wall portions of the ultrasonic transducer 1 portion as shown in FIG. 5. At the same time, along with the propagation of the lamb wave $V_{p0}$, the leaking wave is radiated in a specific direction in the piping 3, e.g. $\theta_{31}$. The leaking propagation wave is reflected at the wall surface on the opposite side or is again radiated. As a result, the piping wall portion of the piping 3 on the receiving side also receives the component of the ultrasonic wave being propagated from the direction of $\theta_{31}$ in the fluid in the piping 3, so that, generally, the angle of refraction of the received wave is different from the direction $\theta_3$ initially expected by Snell's Law.

Further description of this will be given by a specific example. For example, in FIG. 3, wedge members 1A and 2A are made of acrylic resin and an ultrasonic vibration element having an output frequency of 1 MHz and the diameter of 20 mm is used. Piping 3 is formed of a steel pipe having a wall thickness of 3.2 mm and water flows in the interior thereof. In this case, the energy transmittivity is shown in FIG. 6.

When an angle of incidence $\theta_1$ is set at 47°, the ultrasonic wave is radiated into the flowing water in the piping 3 with a spreading of $\pm 4°$ in the direction of $\theta_3 = 23°$, and the reflected leaking wave is reflectingly propagated to the side of the ultrasonic transducer 2. When the reflected wave is in this range, the ultrasonic transducer 2 portion receives the ultrasonic wave obtained by the excitation of the piping 3 within the range of the angle of incidence from 38° to 61°. S$_0$ mode is present within this range as shown in FIG. 6.

Figure 6:
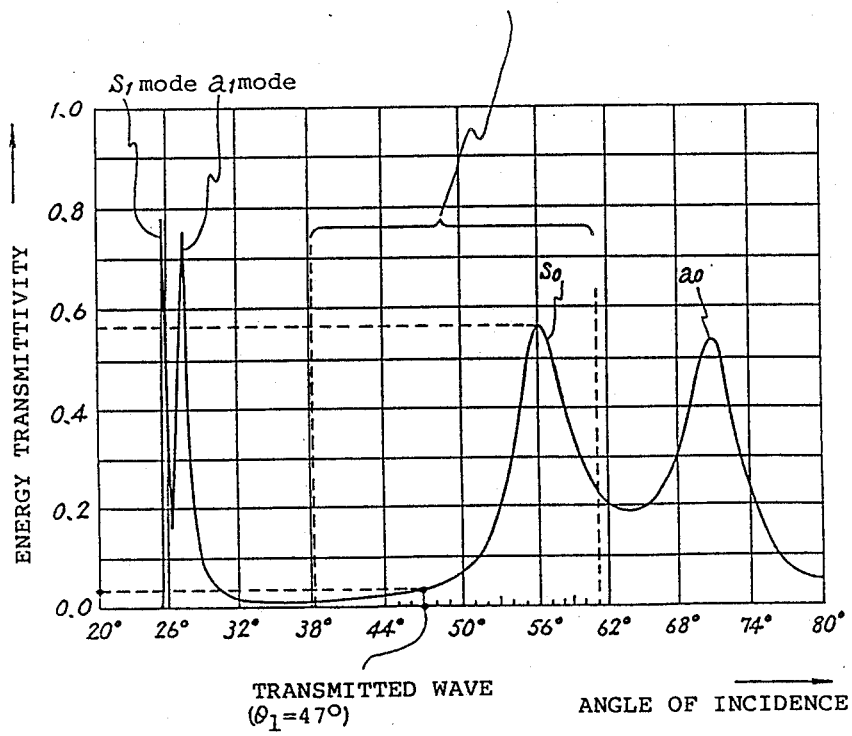
FIG. 6 is an explanatory view showing the spreading of the received waves and acoustic resonance points of the piping to be measured when the angle of directivity is broad.

For this reason, in the specific example of FIG. 6, irrespective of the ultrasonic wave being obtained at the angle of incidence $\theta_1 = 47°$, the ultrasonic wave of the resonance wave of the S$_0$ mode is output by the receiving side at $\theta_1 = 56°$, so that the component of the ultrasonic wave of the angle of refraction which is different from the angle of refraction initially expected is strongly received. As a result, the measured values are low in reliability.

Figure 7:
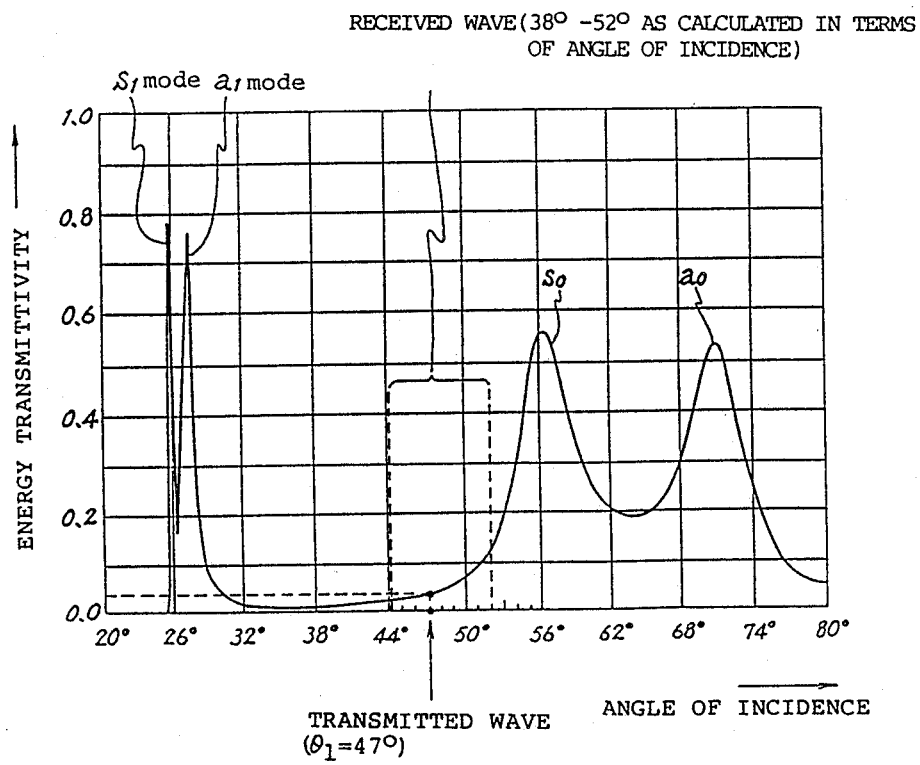
FIG. 7 is an explanatory view showing the spreading of the received wave and acoustic resonance points of the piping to be measured when the angle of directivity is small.

In the case where $b = 18 \lambda$ is set in FIG. 3 according to the present invention, the equation (F-2) leads to $\beta = 3.4°$, with the directivity being $\pm 1.7°$. As shown in FIG. 7, at the angle of incidence 47° of the transmitted wave, the receiving side receives the propagated wave in the direction within the range of the angle of incidence from 38° to 52°. Accordingly, in this case, there is almost no occurrence of the S$_0$ mode, and also, almost no occurrence of harmful waves which are different in the angle of refraction, so that the receiving side can effectively receive the ultrasonic wave from the transmitting side as at the angle of refraction, which is initially expected.

Figure 8:
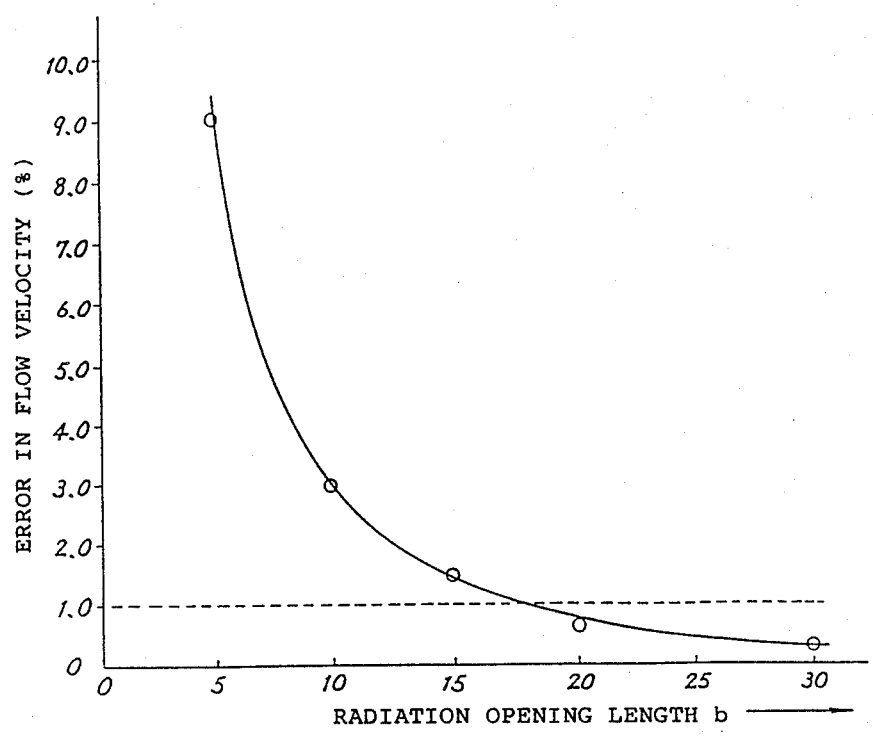
FIG. 8 is a chart showing the spreading of the received wave when the angle of spreading and the directivity characteristics in this embodiment are small.
Figure 9:
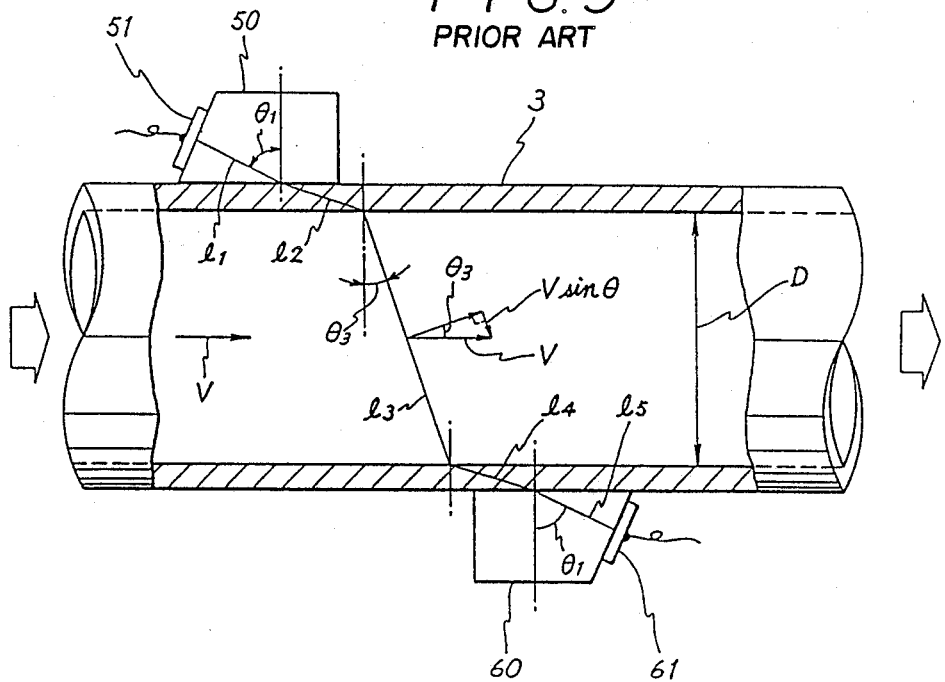
FIG. 9 is an explanatory view showing a conventional example.

In FIG. 8, the relationship between the sizes (lengths) of the opening surfaces of radiation of the ultrasonic transducers 1 and 2 and the errors in the measured values which are calculated in terms of the flow velocity in the case of the specific flow rate measuring is experimentally surveyed in addition to the series of studies as described above. According to the results of the experiments, the size of the opening surface of radiation was $b \geq 15 \lambda$ and the errors were 1.5% or less.

From the equation (F-2) and the results of the experiments shown in FIG. 8, if $b \geq 18 \lambda$, then the directivity becomes within $\pm 1.6°$, and the characteristics close to parallel beams are shown. Accordingly, it has been positively proven that the errors in measuring can be satisfactorily reduced.

In the above embodiment, the ultrasonic wave emitted from the vibration element 1B of the ultrasonic transducer 1 becomes the parallel beams indicated by dotted lines $g_1$ and $g_3$ in FIG. 4 and are propagated and reflected at the bottom surface of the piping, and finally, received by the vibration element 2B of the ultrasonic transducer 2. However, in this case, only the ultrasonic wave beams traveling through the hatched area, i.e., the area between the dotted lines $g_1$ and $g_2$, can be effectively received. However, the ultrasonic wave beams traveling through an area between dotted lines $g_2$ and $g_3$ are not received. The center path at this time is indicated by a solid line $g_0$.

Accordingly, even if the ultrasonic transducer 2 on the other side is provided at a different position x as shown in FIG. 4, for example, the ultrasonic transducer 2 receives the ultrasonic wave between the dotted lines $g_2$ and $g_3$. Therefore, changes in the mounting position of the ultrasonic transducer 2 do not cause trouble in measuring.

The present invention, with the above described arrangement and functions, can provide a method of an and an apparatus for measuring the flow velocity by ultrasonic waves, which are outstanding and have not yet been seen, wherein adjusting of set positions of the ultrasonic transducers becomes remarkably easy, necessity of positioning the ultrasonic transducers with high accuracy as in the past is eliminated, and, if the distance between the ultrasonic transducers and the sizes of opening lengths of the ultrasonic transducers are known, then these values can be regarded as the basic data for calculating the flow velocity. Therefore, the measuring operations can be performed quickly, with high accuracy, and if the sound velocities of the portions exposed to the outside, i.e., the wedge members of the ultrasonic transducers are accurately measured in advance, then, even if the sound velocity of the fluid in the piping is unclear, measuring of the flow velocity can be performed without requiring correction for temperature.

What is claimed is:

1. A method of measuring the flow velocity of a fluid by using ultrasonic waves, comprising:

providing two ultrasonic transducers, spaced from each other a predetermined distance $L_x$, wherein said ultrasonic transducers provide ultrasonic waves with a small angle of directivity on the upstream and downstream sides, respectively, of a piping;

causing the ultrasonic waves to alternately and obliquely enter into said piping through the outer wall thereof so as to measure sound velocities $C_1$ of wedge portions in said ultrasonic transducers at the time of measurement; and propagating the ultrasonic waves from the upstream side to the downstream side and from the downstream side to the upstream side at approximately the time of said measurements so that the propagation times $t_d$ and $t_u$, which represent propagation times of the ultrasonic waves through the wall of the piping and the fluid in said piping, are measured in sequence, and said measured values $C_1$, $t_d$, $t_u$ and the distance $L_x$ between said ultrasonic transducers are substituted into a function, $V=F(C_1,t_u,t_d,L_x)$, which is calculated by use of known constants, to thereby specify the flow velocity of the fluid in said piping.

2. An apparatus for measuring the flow velocity of a fluid by using ultrasonic waves, comprising:

two ultrasonic transducers for producing ultrasonic waves, each of which ultrasonic waves form a very small angle of directivity, said ultrasonic transducers being mounted on the upstream and downstream sides of a piping along a line of propagation of the ultrasonic waves, respectively, and a transmission-reception changeover section for switchingly connecting a transmitting circuit section and a receiving circuit section to said two ultrasonic transducers alternately;

said receiving circuit section being provided with a timer means for measuring propagation times $t_d$ and $t_u$ of the ultrasonic waves which are output from said ultrasonic transducers and transmitted from the upstream side to the downstream side and from the downstream side to the upstream side, times $t_d$ and $t_u$ being times the ultrasonic waves are propagated in the wall of the piping and the fluid in the piping, and a memory means for storing said propagation times $t_d$ and $t_u$ and a mounting distance $L_x$ between said ultrasonic transducers; and said memory means being capable of storing measured values of sound velocities $C_1$ of wedge members in said ultrasonic transducers at the time of measuring the flow velocity and at least one other known constant, and further including a flow velocity operational means for performing predetermined calculations on the basis of respective output data from said memory means, to thereby specify the flow velocity of the fluid in said piping.

3. An apparatus for measuring the flow velocity of a fluid by using ultrasonic waves as set forth in claim 2, wherein:

said ultrasonic transducers each includes a wedge member as being an ultrasonic wave propagating member and an ultrasonic vibration element for making the ultrasonic wave fall into the piping and be propagated through said wedge member; and an opening length of a surface of said wedge member in contact with the piping is about 15 wave lengths or more of a center frequency used of said ultrasonic vibration element.

4. An apparatus for measuring a flow velocity of a fluid by using ultrasonic waves as set forth in claim 3, wherein the opening length of the surface of said wedge member in contact with the piping is about 18 wave lengths or more of the center frequency used.

5. An apparatus for measuring the flow velocity of a fluid by using ultrasonic waves as set forth in claim 3, wherein said wedge members are provided on a same line that is substantially parallel to the axis of said piping.

6. An apparatus for measuring the flow velocity of a fluid by using ultrasonic waves as set forth in claim 3, wherein each of said wedge members is formed to provide a trapezoidal shape having opposing slanted surfaces.

* * * * *

UNITED STATES PATENT AND TRADEMARK OFFICE
CERTIFICATE OF CORRECTION

PATENT NO. : 4,930,358

DATED : June 5, 1990

INVENTOR(S) : Ryohei MOTEGI et al.

Page 1 of 2

It is certified that error appears in the above-identified patent and that said Letters Patent is hereby corrected as shown below:

```
Column 1, line 25, change "i" to ---i₁---.
Column 1, line 26, after "vibration" insert ---element---
Column 1, line 40, before "time" insert ---same---.
Column 1, line 44, after "i.e." insert ---,---.
Column 2, line 47, change "in" to ---is--- after "wave".
Column 3, line 3, change "objected" to ---objects---.
Column 3, line 64, change "supersonic" to ---ultrasonic---.
Column 4, line 29, change "wedges" to ---wedge---.
Column 4, line 31, change "page" to ---path---.
Column 4, line 50, change "transducers" to ---transducer---.
Column 5, line 25, before "received" insert ---and---.
Column 5, line 54, change "Lo)/2" to ---Lo)/2}---.
Column 5, line 54, change "U₁" to ---θ₁---.
Column 5, line 54, change "φ₂" to ---θ₂---.
Column 5, line 56, change "φ₃" to ---θ₃---.
Column 5, line 61, after "2a" insert ---and---.
Column 6, line 12, change "φ₁" to ---θ₁---.
Column 6, line 12, change "φ²)/C²" to ---θ₂)/C₂---.
Column 6, line 14, change "φ³" to ---θ₃---.
Column 6, line 14, of the printed patent, change "C²-V sinφ³" to ---C₃V sinθ₃---.
Column 6, line 14, change "τ=" to ---τ₂---.
Column 6, line 16, change "tᵈ=[{(Lˣ-L°)sinφ¹}/C¹]" to ---t_d=[{(Lₓ-L₀)sinθ₁}/C₁]---.
Column 6, line 16, change "φ₂" to ---θ₂---.
Column 6, line 18, change "φ₃" to ---θ₃--- (both occurrences).
Column 6, line 31, change "φ₁" to ---θ₁---.
Column 6, line 34, change "φ₁" to ---θ₁---.
Column 6, line 38, change "φ₁" to ---θ₁---.
```

UNITED STATES PATENT AND TRADEMARK OFFICE
CERTIFICATE OF CORRECTION

PATENT NO.  : 4,930,358

DATED       : June 5, 1990

INVENTOR(S) : Ryohei MOTEGI et al.

It is certified that error appears in the above-identified patent and that said Letters Patent is hereby corrected as shown below:

```
Column 6, line 38, change "φ₂" to ---θ₂---.
Column 6, line 38, before "=" insert ---τ---.
Column 6, line 42, change "₁" to ---θ₁---.
Column 6, line 43, change "₌" to ---τ₌---.
Column 6, line 50, change "sin" to ---(sin---.
Column 6, line 56, change "-" to ---=--- after "C₃".
Column 7, line 21, change "±3°" to ---+3°---.
Column 8, line 50, delete "an" after "of".
```

Signed and Sealed this

Eighth Day of March, 1994

BRUCE LEHMAN

*Attest:*

*Attesting Officer*     Commissioner of Patents and Trademarks